(12) United States Patent
Reales

(10) Patent No.: US 9,447,558 B2
(45) Date of Patent: Sep. 20, 2016

(54) OFFSHORE FOUNDATION FOR WIND ENERGY INSTALLATIONS

(75) Inventor: Emilio Bertomeo Reales, Horstedt (DE)

(73) Assignee: MARITIME OFFSHORE GROUP, GmbH (DE)

( * ) Notice: Subject to any disclaimer, the term of this patent is extended or adjusted under 35 U.S.C. 154(b) by 0 days.

(21) Appl. No.: 14/072,326

(22) PCT Filed: Mar. 16, 2012

(86) PCT No.: PCT/EP2012/054700
§ 371 (c)(1),
(2), (4) Date: Dec. 9, 2013

(87) PCT Pub. No.: WO2012/152483
PCT Pub. Date: Nov. 15, 2012

(65) Prior Publication Data
US 2014/0086691 A1    Mar. 27, 2014

(30) Foreign Application Priority Data

May 12, 2011   (DE) .................. 20 2011 100 627
May 31, 2011   (DE) .................. 20 2011 101 599

(51) Int. Cl.
*E02B 17/00*      (2006.01)
*E02D 27/52*      (2006.01)
(Continued)

(52) U.S. Cl.
CPC ......... *E02D 27/525* (2013.01); *E02B 17/0004* (2013.01); *E02D 27/12* (2013.01); *E02D 27/42* (2013.01); *E02D 27/425* (2013.01); *E02D 27/52* (2013.01); *F03D 13/22* (2016.05); *E02B 2017/0091* (2013.01);
(Continued)

(58) Field of Classification Search
USPC .............................. 405/224, 203, 204, 195.1
See application file for complete search history.

(56) References Cited

U.S. PATENT DOCUMENTS 3,852,969 A    12/1974   Gibson et al.
4,695,202 A  *  9/1987   Ferrari Aggradi et al. .. 405/227
(Continued)

FOREIGN PATENT DOCUMENTS

DE    2657396 A1   12/1976
DE   10357392 A1    4/2005
(Continued)

OTHER PUBLICATIONS

International Search Report which issued in connection with the corresponding PCT application.
(Continued)

*Primary Examiner* — Sean Andrish
(74) *Attorney, Agent, or Firm* — Clark Hill PLC; David J. Marr

(57) ABSTRACT

This invention relates to an offshore supporting structure (1) for wind energy installations with multiple, preferably six, specifically tubular piles (2) that can be anchored in the seabed, and a latticework structure (4) assembled from multiple bars, specifically steel tubes (14). Pursuant to the invention, we propose that the latticework structure (4) be assembled from multiple, prefabricated latticework segments (6, 8, 10, 12), where each latticework segment (6, 8, 10, 12) has six lower corners (3a, 3b, 3c, 3d) and six upper corners (5a, 5b, 5c, 5d), where the upper corners (5a, 5b, 5c) of one latticework segment (6, 8, 10) can be attached to the lower corners (3b, 3c, 3d) of an adjacent latticework segment (8, 10, 12).

13 Claims, 4 Drawing Sheets

(51) Int. Cl.
*E02D 27/42* (2006.01)
*E02D 27/12* (2006.01)
(52) U.S. Cl.
CPC ... *F05B 2240/9121* (2013.01); *F05B 2240/95* (2013.01); *F05B 2240/97* (2013.01); *Y02E 10/727* (2013.01); *Y02E 10/728* (2013.01)

(56) References Cited

U.S. PATENT DOCUMENTS

| | | | |
|---|---|---|---|
| 4,696,604 A * | 9/1987 | Finn et al. | 405/227 |
| 4,755,081 A * | 7/1988 | Esparza | 405/168.1 |
| 4,941,775 A * | 7/1990 | Benedict | C23F 13/02 |
| | | | 204/196.17 |
| 5,044,828 A * | 9/1991 | Berner et al. | 405/202 |
| 2007/0243063 A1 | 10/2007 | Schellstede | |

FOREIGN PATENT DOCUMENTS

| | | |
|---|---|---|
| DE | 102007039957 A1 | 2/2009 |
| DE | 202008014974 U1 | 6/2009 |
| DE | 202010011624 U1 | 12/2010 |
| DE | 102009039710 A1 | 3/2011 |
| EP | 2067914 * | 1/2008 |
| EP | 2067913 A2 | 6/2009 |
| NO | 320948 B1 | 2/2006 |
| NR | 304833 B | 5/1970 |
| WO | 2007/106044 | 9/2007 |
| WO | WO2007106044 A1 | 9/2007 |
| WO | WO-2010147481 A1 | 12/2010 |
| WO | WO-2012152483 A2 | 11/2012 |

OTHER PUBLICATIONS

German Search Report.
European Search Report.

* cited by examiner

OFFSHORE FOUNDATION FOR WIND ENERGY INSTALLATIONS

CROSS-REFERENCE AND INCORPORATION BY REFERENCE

This application is a 371 of International Application No. PCT/EP2012/054700, filed on Mar. 16, 2012, which, in turn, claims priority to German Application No. DE 20 2011 100627.5, filed on May 12, 2011, and to German Application No. DE 20 2011 101599.1, filed on May 31, 2011. Each of these applications are incorporated by reference.

This invention relates to an offshore foundation for wind energy installations. Such foundations or supporting structures are used to anchor wind energy installations securely to the seabed.

FIELD OF THE INVENTION

For some time now, wind energy installations have been installed not just onshore, i.e. on land, but also offshore, i.e. at sea, as for example in the offshore wind farms in the North Sea and the Baltic Sea. Offshore wind energy installations are subject to extreme conditions. For example, they are anchored in sea depths of 20 to 60 meters using a foundation. The foundation, which can also be referred to as a supporting structure, is subject to extreme mechanical and chemical loads and sea currents. Different types of offshore to foundations are known, for example monopile, jacket, tripod, tripile or bucket designs. This invention primarily concerns a jacket construction design. This is a latticework made of steel.

SUMMARY OF THE INVENTION

The object of this invention is to present an offshore foundation or supporting structure for wind energy installations, specifically an offshore foundation which can be manufactured, transported, assembled and/or repaired with little effort or expense.

The invention resolves this issue by using an offshore supporting structure with multiple, preferably six, piles which can be anchored in the seabed and are specifically tubular, and a composite latticework structure consisting of many bars, specifically steel tubes, such that the latticework structure can be made of multiple prefabricated latticework segments, where each latticework segment has six corners that can be connected to the corners of another latticework segment.

The steel tubes are preferably attached to the latticework structure using nodes. This type of node preferably connects two or more, specifically at least three, tubes to one another. The latticework segments are designed to be hexagonal, in accordance with the invention. Here, a hexagonal design refers essentially to a cross-section of the latticework segment. The latticework segments will preferably have a hexagonal cross-section relative to a central axis, and will preferably be essentially cylindrical or conical in design. The hexagonal shape of the supporting structure in particular, which is preferably supported on six piles that can be anchored in the seabed, is advantageous because it offers advantageous load transfer. The supporting structure is also highly rigid and stable, allowing the overall weight and therefore the quantity of materials used in the supporting structure to be reduced.

Pursuant to another aspect of the invention, or a preferred embodiment, the issue specified at the start will be resolved by a supporting structure, where the latticework segments are essentially constructed from HFIW tubes. HFIW (high-frequency induction welding) tubes are easy to manufacture, as sheets of metal are rolled, formed into tubes and then sealed along their length with an HFIW weld seam. Such tubes are easily available and inexpensive. The benefit of constructing the supporting structure from this type of tube is that costs can be reduced. Moreover, manufacturing times for this type of supporting structure are shortened because HFIW tubes are readily available on the market.

In another aspect or a preferred embodiment, the supporting structure resolves the issue specified above with a supporting structure, where some or all nodes in the prefabricated latticework segments are made of double-walled tube structures. It is easy to manufacture this type of double-walled tube structure. These tubes offer a simple method of connecting tubes. This type of double-walled tube structure will preferably be formed by initially heating a section of tube or tube shaft. A second section of tube, which has an external diameter that is essentially the same as the internal diameter of the heated tube shaft, is therefore inserted into the heated tube shaft. The tube shaft is shrunk by rapid cooling, forming a bond between the tube shaft and the tube section with the smaller diameter. The tube section with the smaller diameter is then positioned inside the tube shaft in such a way that a small part of it protrudes from the tube shaft, allowing a second tube to be pushed onto the protruding part of the tube section with the smaller diameter. Costs are further reduced by using this simple bonding method.

In one preferred embodiment, the supporting structure consists of six piles in the seabed, which are essentially positioned parallel to one another. The piles are arranged to support the supporting structure, which will preferably be tall enough that it essentially reaches from the seabed to the surface of the water. As the piles are essentially parallel to one another, and essentially perpendicular to the surface of the water, they are particularly easy to anchor in the seabed. They will preferably be of a length to provide secure under-pinning of the supporting structure.

Pursuant to another preferred embodiment, a latticework segment will be attached to the piles by multiple base nodes, where in each case, there will be one node on the upper end of a pile and one in a corner of the latticework segment. The supporting structure can therefore be connected using base nodes. Preferably, pursuant to this embodiment, there will be connector elements on the piles and on the base nodes that can be used to attach the supporting structure to the piles. These connector elements will preferably be designed such that manufacturing and assembly tolerances will be balanced. This allows for easy assembly.

These base nodes will preferably be laid out on one plane, which will be defined by the upper end sections of the piles sunk into the seabed. This plane will preferably be uniformly hexagonal.

It is particularly preferable that four tubes in the latticework structure can be attached to one another using the base nodes. Being able to attach four tubes with base nodes means the supporting structure will be very stable.

Pursuant to another preferred embodiment, at least one latticework segment will have a middle node in each corner, which can be used to attach the latticework segment to another latticework segment. The middle nodes therefore represent the point of connection between two latticework segments arranged one above the other. Here, being arranged one above the other refers to standard installation of the supporting structure on the seabed. An upper latticework segment therefore applies force on a lower latticework segment via the middle nodes. The middle nodes will preferably be arranged in such a way that they lie on one plane and define a uniform hexagon. Preferably, the middle nodes will also be aligned such that the hexagon they define will be arranged concentrically, with respect to the hexagon defined by the piles sunk into the seabed. This allows good force transmission and makes the supporting structure very stable.

Preferably, six tubes can be connected to one another using the middle node. Preferably, it will be possible to arrange two of these tubes so that they lie on the plane defined by the middle nodes, and another two will point upwards or point downwards and form part of the adjacent latticework segments. This will allow the best possible connection to adjacent latticework segments. It also stabilizes the supporting structure and reduces the quantity of materials required.

Preferably, each latticework segment will have at least one cross node, where a cross node is placed between the lower corners of a latticework segment and the upper corners of a latticework segment. These cross nodes are well suited as connector elements between two planes delimited by the latticework segments. A cross node is preferably also used on the supporting structure to transmit any torsional forces in effect. This increases stability further, but also means fewer materials are required.

Preferably, these cross nodes will have an essentially x-shaped structure.

Pursuant to another preferred embodiment, at least one latticework segment will have upper nodes on the upper corners, on which three tubes can be connected together. This type of latticework segment is particularly well-suited as the top segment. It will preferably form the end segment of the supporting structure, which reaches up to or above the surface of the water.

It is particularly preferred that the steel tubes be bonded to the respective nodes using orbital welding. This is particularly beneficial if the nodes are made of double-walled tube structures. A tube can then be slid over the protruding smaller tube of the node and bonded to the node using orbital welding. The tube shaft of the node will therefore preferably have essentially the same external diameter as the external diameter of the tube. Orbital welding is a process that is particularly well-suited for attaching this type of tube structure. It allows the supporting structure to be produced even more cost-effectively, thereby reducing costs. Furthermore, using orbital welding for weldseams produces higher quality goods, thereby improving the lifespan and load capacity of the supporting structure.

In another preferred embodiment, there will be an interface for mounting a wind energy installation tower above the latticework structure. The interface will preferably be located at a height which is above the surface of the sea. By using such an interface, the supporting structure can be connected to the tower particularly easily, thereby simplifying assembly.

It is also preferred that there be an accessible platform beneath the interface, located approximately in the area of the upper corner of the upper latticework segment. Such an accessible platform may be used as a landing stage for service ships. This type of platform will also allow access for maintenance staff who have to maintain the wind energy installation mounted on the supporting structure. This will make it easier to operate the supporting structure.

Pursuant to another embodiment, it is preferred that the tubes have a wall thickness of up to approximately 30 mm, preferably approximately in the range of 25.4 mm, and/or are manufactured using a hot-rolled wide strip process. Such wall thicknesses are particularly well suited to the supporting structure. They offer excellent stability without entailing the use of unnecessarily large quantities of materials. This also allows costs to be reduced. The hot-rolled wide strip process is also a simple way of manufacturing this type of tube. Preferably, the tubes will finally be attached using an HFIW weldseam.

In another preferred embodiment, the tubes will be at least partially coated with a coating, specifically with a plastic coating. The supporting structure is therefore adapted for use in the sea. The salt content of seawater makes it a highly corrosive environment for the supporting structure. Coating the supporting structure will protect it from corrosion, thereby improving the lifespan of the supporting structure. This also reduces maintenance costs.

It is particularly preferred that the supporting structure have six piles and three or four latticework segments. Three or four latticework segments are preferred numbers of segments, through which, on the one hand, a supporting structure of the correct height can be manufactured and, on the other hand, good stability can be achieved with few materials.

Preferably, the piles and bars of the latticework structure will be made of steel. Steel is a readily available material which guarantees good stability. Steel is also inexpensive.

When assembling a supporting structure in accordance with the invention, the following procedure is preferred. First, the working platform or nodes that can be attached to a working platform or that can form an interface to a wind energy installation is/are attached to an assembly stage. Such an assembly stage will preferably be height-adjustable. It will preferably be constructed on a ship or on land. The supporting structure will then be constructed from top to bottom. This means that the next step is, preferably, to attach the top segment beneath the working platform or any equivalent. This segment can also then be at least partially prefabricated and then assembled and fitted. Alternatively, individual steel tubes can be individually attached to the nodes fixed to the assembly stage. This will preferably be done using orbital welding. After one segment is completed, the next segment will be fitted. The segment with the base nodes will be the last segment to be fitted. Then the latticework structure constructed in this way can be mounted on the piles sunk into the seabed.

BRIEF DESCRIPTION OF THE SEVERAL VIEWS OF THE DRAWINGS

By way of example, the invention is described in more detail below using some exemplary embodiments, with reference to the accompanying figures. The figures show the following.

DETAILED DESCRIPTION OF THE INVENTION

Figure 1:
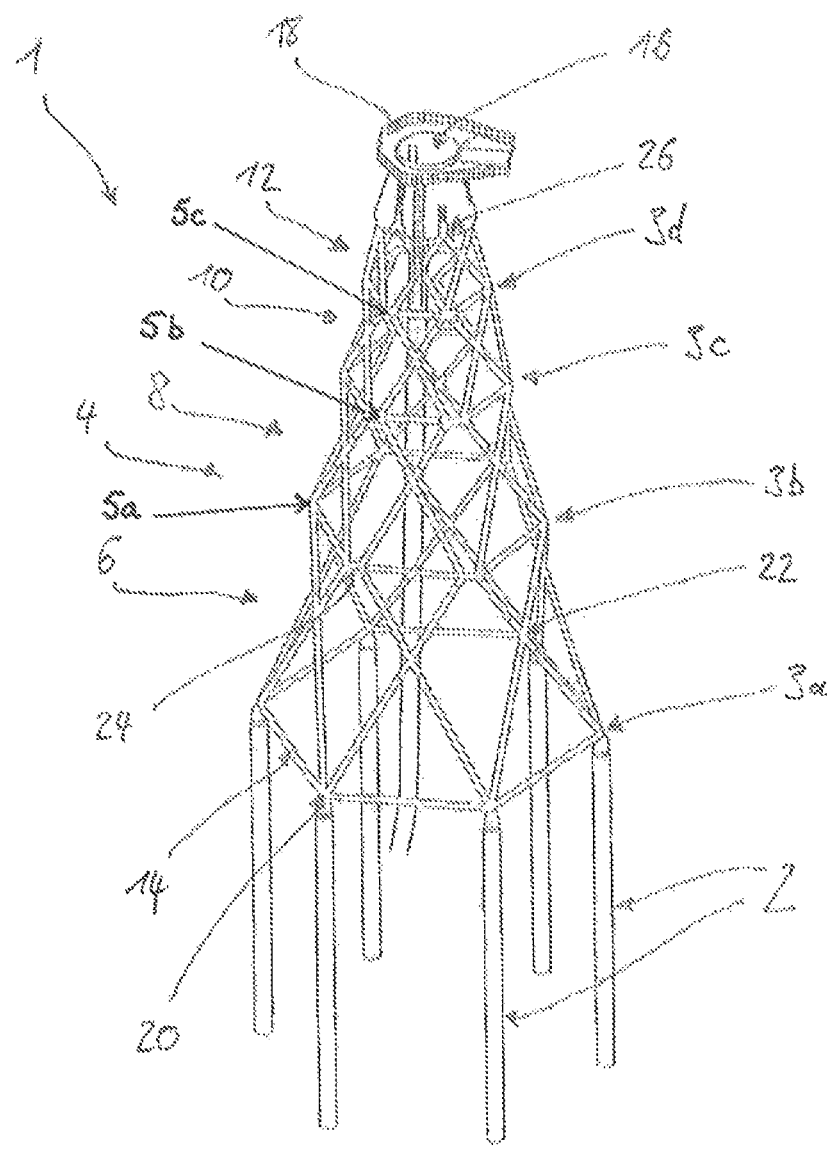
FIG. 1 a first exemplary embodiment of an offshore foundation in a perspective view.

According to FIG. 1, the offshore supporting structure 1 for wind energy installations has six piles that can be anchored in the seabed (only two have reference numbers).

A latticework structure 4 is attached to the piles 2. The latticework structure 4 is designed to be essentially conical or frustum-shaped and essentially has a rectangular cross-section based on a longitudinal axis of the latticework structure 4. It is connected by its six lower corners 3a (only one has a reference number) to the six piles 2. The latticework structure 4 has four segments 6, 8, 10, 12, which are placed above one another, essentially coaxially to one another. The latticework structure 4 as well as segments 6, 8, 10, 12 are formed of tubes 14 (only one has a reference number), which are attached to one another by nodes 20, 22, 24, 26.

Each segment 6, 8, 10, 12 is essentially conical or frustum-shaped and has a hexagonal cross-section, which accordingly is uniformly hexagonal. A segment 6, 8, 10, 12 therefore has six lower corners 3a, 3b, 3c; 3d and six upper corners 5a, 5b, 5c, 5d (only one of each corner type has a reference number). Therefore, for example, the lowest segment 6 has six lower corners 3a (only one has a reference number) and six upper corners 5a (only one has a reference number). The six upper corners 5a of the lowest segment 6 simultaneously form the lower corners 3b of the second lowest segment 8. On the corners 3a of the lowest segment are base nodes 20 while on the corners 3b, 5a, 3c, 5b, 3d, and 5c there are middle nodes 24. The base nodes 20 and the middle nodes 24 are therefore each essentially connected to horizontally placed tubes 14, thereby forming an essentially uniform hexagon. The upper corners 5a, 5b, 5c, 5d of each segment 6, 8, 10, 12 are also connected to the lower corners 3a, 3b, 3c, 3d of each segment 6, 8, 10, 12 via tubes 14 and cross nodes 22 in a vertical direction and spaced apart. The tubes 14 and the cross nodes 22 are therefore arranged on the latticework structure 4 so that they essentially lie in a lateral surface of the latticework structure 4. The inside of the latticework structure 4 is therefore hollow or free of tubes and braces. The precise configuration of the individual nodes 20, 22, 24, 26 can be seen in FIGS. 4 to 7.

At the upper end of the supporting structure 1, an interface 16 is positioned on the latticework structure 4 to hold a wind energy installation. The interface 16 is therefore attached to the upper nodes 26 of the top segment 12. A working platform 18 is also located on the interface 16. For example, service ships used by maintenance staff to reach the supporting structure 1 can land at this working platform in order to maintain one of the wind energy installations attached to it.

Figure 2:
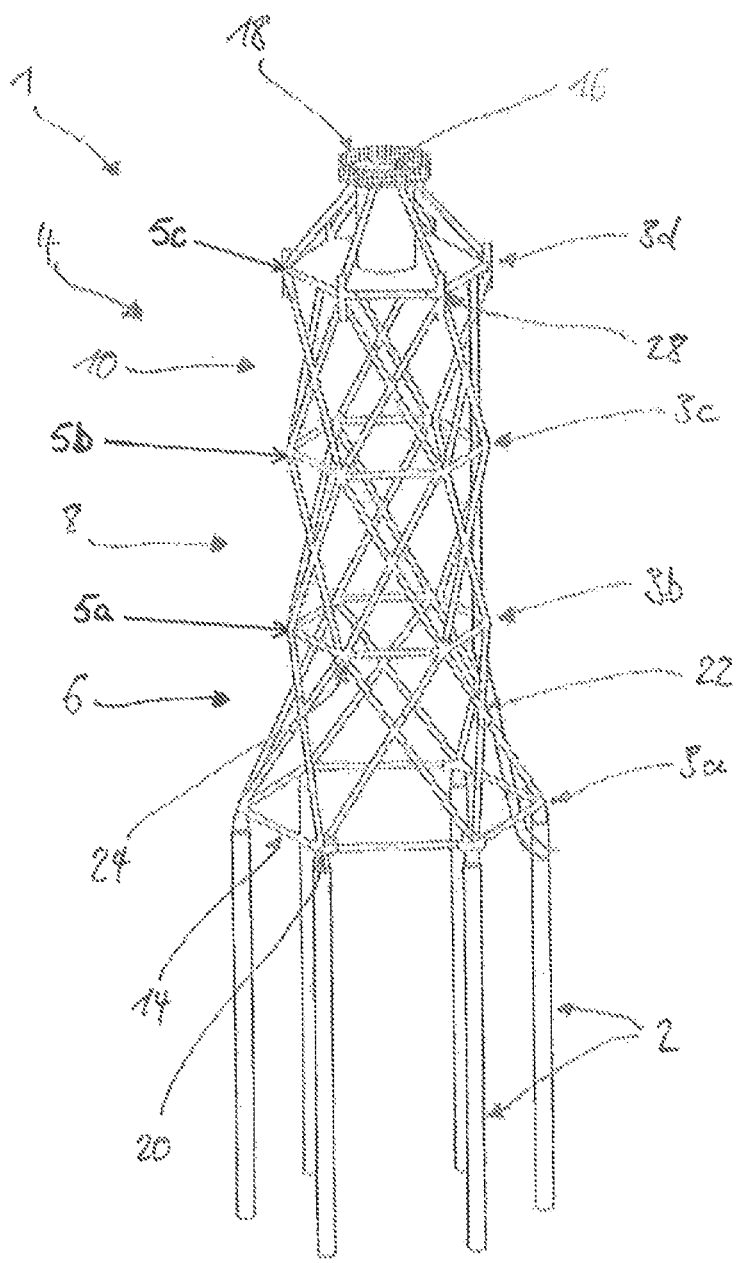
FIG. 2 a second exemplary embodiment of an offshore foundation in a perspective view.
Figure 3:
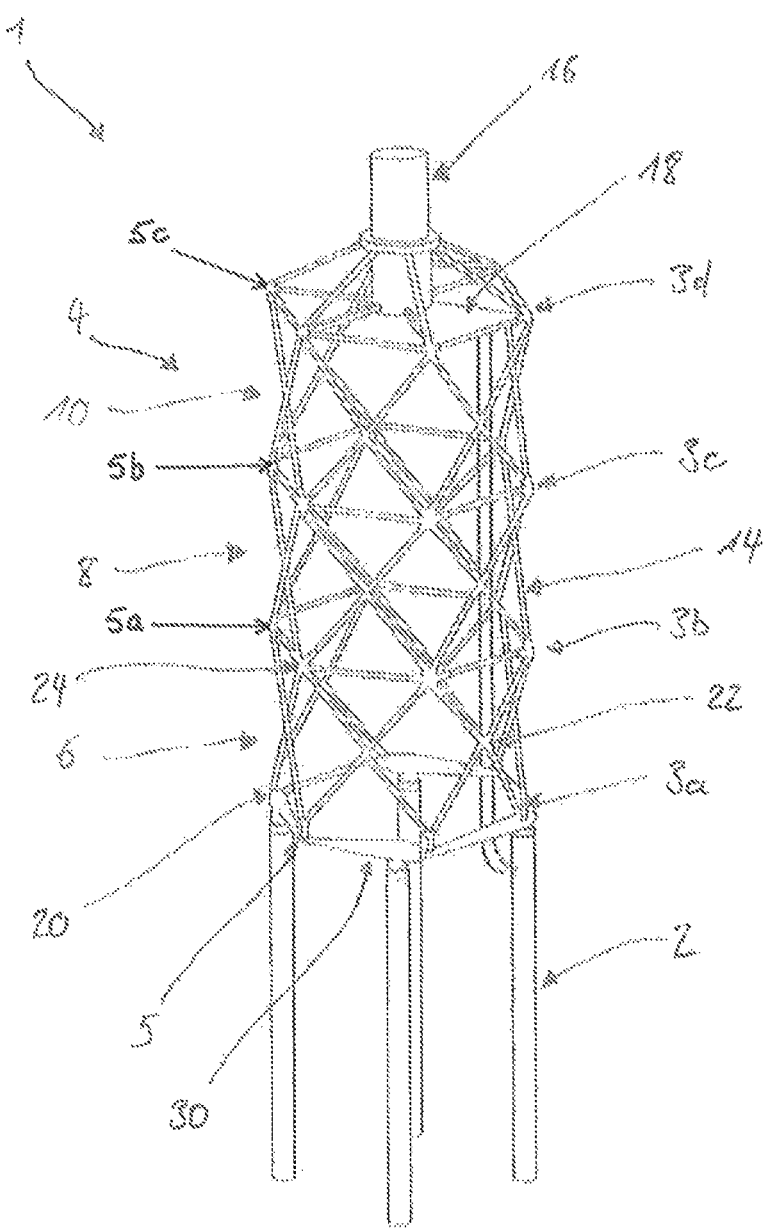
FIG. 3 a third exemplary embodiment of an offshore foundation in a perspective view.
Figure 4:
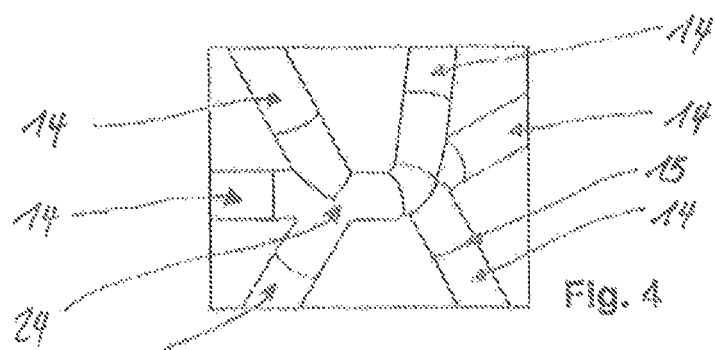
FIG. 4 a middle node.

While the supporting structure 1 is particularly well-suited for large wind energy installations with high towers and high outputs, pursuant to the first exemplary embodiment (FIG. 1), the supporting structures 1 are also well-suited for smaller wind energy installations, pursuant to the second and third exemplary embodiments (FIGS. 2 and 3).

The embodiments regarding the supporting structures 1, pursuant to the second and third exemplary embodiments (FIG. 2 and FIG. 3), are identical and equipped with similar elements with the same reference numbers. In this respect, reference is comprehensively made to the above description of the supporting structure 1, pursuant to the first exemplary embodiment (FIG. 1).

The supporting structure, pursuant to the second exemplary embodiment (FIG. 2), has six piles 2 that can be anchored in the seabed. The latticework structure 4 of the supporting structure 1 has three segments 6, 8, 10, which are placed above one another, essentially coaxially to one another. All segments 6, 8, 10 have an essentially hexagonal cross-section, based on a longitudinal axis which is essentially formed according to a uniform hexagon. While the lowest segment 6 is therefore conical or frustum-shaped, both of the upper segments 8, 10 are essentially cylindrical.

The latticework structure 4 and the segments 6, 8, 10 are formed, as in the first exemplary embodiment (FIG. 1), of tubes 14 and nodes 20, 22, 24, 28. The upper nodes 28, pursuant to the second exemplary embodiment (FIG. 2), are slightly different from the upper nodes 26, pursuant to the first exemplary embodiment (FIG. 1). The reason for this is that the interface 16 for holding the wind energy installation, pursuant to the second exemplary embodiment, is designed slightly differently from the interface 16, pursuant to the first exemplary embodiment.

The supporting structure 1, pursuant to the third exemplary embodiment (FIG. 3), has a latticework structure 4 formed of three segments 6, 8, 10, which are essentially cylindrical with a hexagonal cross-section. Contrary to the first two exemplary embodiments (FIGS. 1 and 2), the supporting structure 1, pursuant to the third exemplary embodiment, only has four piles 2 that can be anchored in the seabed. The upper sections of the piles 2 are attached to specially-formed attachment braces 30 (only one has a reference number), so that the hexagonal segment 6 can be attached to the attachment braces 30 using base nodes 20. Fitting the supporting structure 1 with only four piles 2 may be advantageous if the wind energy installation being mounted on the supporting structure 1 is smaller, or if the seabed does not allow more than four piles 2 to be driven in.

FIGS. 4 to 7 illustrate the various nodes 20, 22, 24, 26 in detail. Pursuant to FIG. 4, a middle node 24 is designed to be able to form one corner of a supporting structure 1 (not shown in FIGS. 4 to 7). The middle node 24 is designed as a double-walled tube structure and is constructed in order to connect six tubes 14 to one another. The tubes 14 are preferably HFIW tubes and attached to the middle nodes 24 using orbital weldseams.

Figure 5:
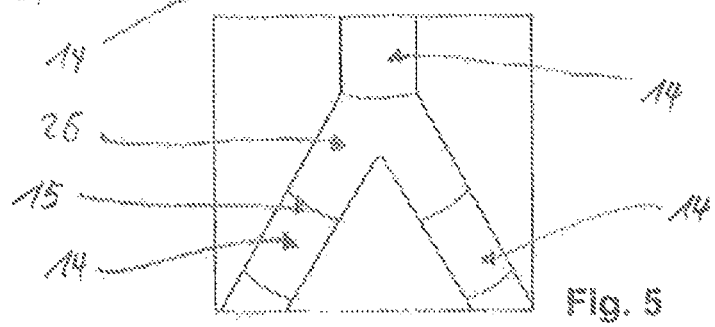
FIG. 5 an upper node.

The upper node 26 illustrated in FIG. 5 is essentially V- or Y-shaped and is constructed in order to connect three tubes 14 to one another. The tubes 14 are in turn attached by orbital welding to the nodes 26 (only one weldseam 15 has a reference number). The upper tube 14 shown in FIG. 5 is constructed so that it can be attached to a platform 18 or an interface 16 of the supporting structure 1 (not shown in FIG. 5). The two lower tubes (shown in FIG. 5) will preferably form part of a top segment 10 or 12.

Figure 6:
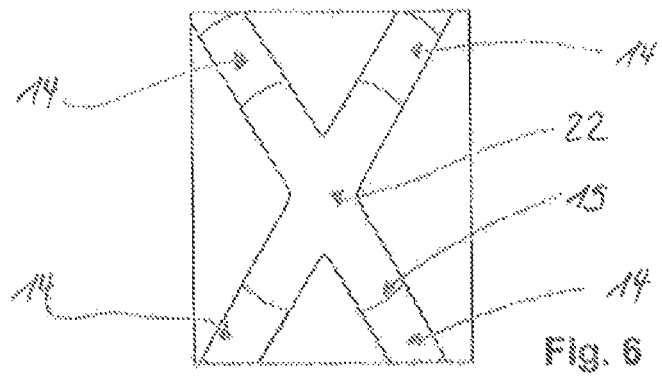
FIG. 6 a cross node.
Figure 7:
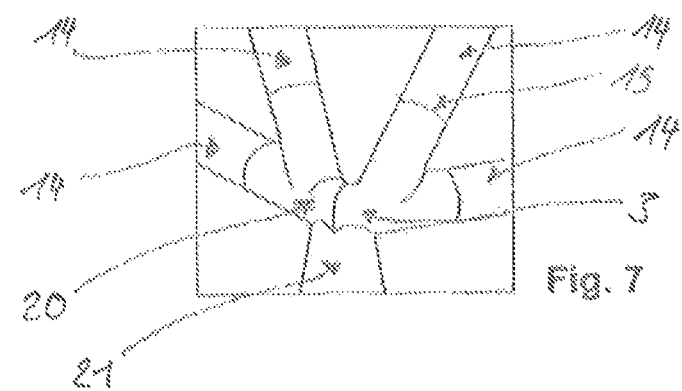
FIG. 7 a base node.

The cross node 22 shown in FIG. 6 is essentially X-shaped and includes two acute and two obtuse angles between its arms. The cross node 22 is constructed to connect four tubes 14 to one another. The tubes 14 are therefore connected to one another by the cross node such that they all lie essentially on one plane.

The base node 20 (FIG. 7) is constructed to connect four tubes 14 to one another. The base node 20 also has an interface 21 for connecting to the piles 2 (not shown in FIG. 7).

All nodes 20, 22, 24, 26 are preferably designed as double-walled tube structures. The tubes 14 are preferably attached using orbital welding to nodes 20, 22, 24, 26.

The invention claimed is:

1. An offshore supporting structure comprising:
   a plurality of piles which are configured to have lower end portions thereof be anchored in a seabed;
   an assembled latticework structure formed of at least six bars and having a node, the assembled latticework structure being configured to be attached to the piles, the node being configured to connect to six of the bars;

wherein the node has first and second branching points that are offset from a center of the node;
wherein the first branching point has three first branching point ends and the second branching point has three second branching point ends; and
wherein each of the three first branching point ends and the three second branching point ends are separately connected to a first end of one of the six bars.

2. The offshore supporting structure as defined in claim 1, wherein the bars are tubes.

3. The offshore supporting structure as defined in claim 2, wherein the latticework structure further comprises a plurality of nodes, each node being formed of double-walled pipe structures.

4. The offshore supporting structure as defined in claim 1, wherein the node is a middle node.

5. The offshore supporting structure as defined in claim 4, further comprising the assembled latticework structure being assembled from a plurality of prefabricated latticework segments.

6. The offshore supporting structure as defined in claim 5, further comprising a plurality of middle nodes and each latticework segment having six lower corners and six upper corners, wherein each upper corner of one of the latticework segments is attached to a corresponding lower corner of an adjacent latticework segment via one of the middle nodes.

7. The offshore supporting structure as defined in claim 6, further comprising a plurality of cross nodes, wherein each cross node has an X-shape and is positioned between the upper and lower corners of one of the latticework segments.

8. The offshore supporting structure as defined in claim 5, further comprising a plurality of base nodes, wherein a lowermost one of the latticework segments is attached to each of the piles by the base nodes, each base node being located at an upper end of a respective pile and in a respective lower corner of the lowermost one of the latticework segments.

9. The offshore supporting structure as defined in claim 5, further comprising a plurality of upper nodes and the latticework segments being comprised of at least three tubes, wherein each upper node is provided at a respective upper corner of an uppermost one of the latticework segments, and wherein each upper node is configured to connect three tubes of the latticework segment together.

10. The offshore supporting structure as defined in claim 1, further comprising an interface which is configured to mount a wind energy installation tower above the latticework structure.

11. The offshore supporting structure as defined in claim 1, wherein the latticework structure has a generally hexagonal cross-section.

12. The offshore supporting structure as defined in claim 1, wherein the first branching point and the second branching point do not overlap.

13. An offshore supporting structure for wind energy installations comprising:
a plurality of tube shaped piles which are configured to have lower end portions thereof be anchored in a seabed;
an assembled latticework structure formed of at least six bars and having a node, the assembled latticework structure being both configured to be attached to the piles and assembled from a plurality of prefabricated latticework segments;
the node having a middle portion comprising a length;
wherein the node is configured to attach to first and second groups of three bars, the first group of three bars being spaced apart from the second group of three bars by the length; and
wherein each latticework segment has six lower corners and six upper corners, the upper corners of one of the latticework segments being configured to be attached to the lower corners of an adjacent latticework segment.

* * * * *